(12) United States Patent
Li et al.

(10) Patent No.: US 10,613,624 B2
(45) Date of Patent: Apr. 7, 2020

(54) DISPLAY DRIVING CIRCUIT, DRIVING METHOD THEREOF AND DISPLAY DEVICE

(71) Applicants: BOE TECHNOLOGY GROUP CO., LTD., Beijing (CN); Beijing BOE Optoelectronics Technology Co., Ltd., Beijing (CN)

(72) Inventors: Yafei Li, Beijing (CN); Bo Gao, Beijing (CN); Tiankuo Shi, Beijing (CN); Wei Sun, Beijing (CN); Hao Zhang, Beijing (CN); Xue Dong, Beijing (CN); Zijiao Xue, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 15/927,932

(22) Filed: Mar. 21, 2018

(65) Prior Publication Data
US 2019/0138089 A1    May 9, 2019

(30) Foreign Application Priority Data
Nov. 7, 2017    (CN) .......................... 2017 1 1084157

(51) Int. Cl.
*G06F 3/01* (2006.01)
*G09G 3/20* (2006.01)
*G06T 5/00* (2006.01)

(52) U.S. Cl.
CPC ........... *G06F 3/013* (2013.01); *G09G 3/2096* (2013.01); *G06T 5/002* (2013.01);
(Continued)

(58) Field of Classification Search
CPC combination set(s) only.
See application file for complete search history.

(56) References Cited

U.S. PATENT DOCUMENTS

| 9,430,038 B2 | 8/2016 | Ebstyne et al. |
| 10,419,746 B2 | 9/2019 | Lu et al. |

(Continued)

FOREIGN PATENT DOCUMENTS

| CN | 105100783 A | 11/2015 |
| CN | 106937531 A | 7/2017 |

(Continued)

OTHER PUBLICATIONS

First Chinese Office Action dated Sep. 29, 2019, received for corresponding Chinese Application No. 201711084157.7, 17 pages.

*Primary Examiner* — Robin J Mishler
(74) *Attorney, Agent, or Firm* — Kinney & Lange, P.A.

(57) ABSTRACT

The present disclosure provides a display driving circuit, a driving method thereof and a display device. An eye tracker is integrated into a data driving chip. The eye tracker may determine eye gazing coordinates according to an eye image sent from an eye image acquisition unit; then a graphics processor processes an image to be displayed, according to the eye gazing coordinates sent from the eye tracker; and finally, the data driving chip controls a connected display panel to display according to the processed image to be displayed which is sent from the graphics processor.

13 Claims, 5 Drawing Sheets

(52) U.S. Cl.
CPC ........... *G09G 2310/0205* (2013.01); *G09G 2310/0213* (2013.01); *G09G 2320/08* (2013.01); *G09G 2340/0407* (2013.01); *G09G 2354/00* (2013.01)

(56) References Cited

U.S. PATENT DOCUMENTS

| | | | |
|---|---|---|---|
| 2002/0051153 A1* | 5/2002 | Hiyama | G09G 3/20 358/1.9 |
| 2015/0172545 A1* | 6/2015 | Szabo | H04N 5/23238 348/36 |
| 2016/0018888 A1 | 1/2016 | Buford | |
| 2016/0342205 A1* | 11/2016 | Shigeta | A61B 3/113 |
| 2018/0096194 A1* | 4/2018 | Glaholt | H04N 5/2258 |

FOREIGN PATENT DOCUMENTS

| | | | |
|---|---|---|---|
| CN | 107065197 A | 8/2017 | |
| CN | 107105333 A | 8/2017 | |
| EP | 3155560 A1 | 4/2017 | |
| JP | 2017516250 A | 6/2017 | |

\* cited by examiner

DISPLAY DRIVING CIRCUIT, DRIVING METHOD THEREOF AND DISPLAY DEVICE

CROSS REFERENCE TO RELATED APPLICATION

The present disclosure claims a benefit from Chinese Patent Application No. 201711084157.7 filed on Nov. 7, 2017 and titled "DISPLAY DRIVING CIRCUIT, DRIVING METHOD THEREOF AND DISPLAY DEVICE", which is incorporated here by reference in its entirety.

TECHNICAL FIELD

The present disclosure relates to the field of display technology, and in particular, to a display driving circuit, a driving method thereof and a display device.

BACKGROUND

Currently, a common problem faced by virtual reality technology (VR/AR) is that the user's computer hardware cannot satisfy requirements of the display device for high-definition rendering. In order to solve this problem, the current recognized way is a local rendering technology combined with gazing point tracking. During eye imaging, imaging in a foveal field of view is clear and the foveal field of view has higher visual acuity, while imaging in a surrounding field of view is vague. Thus, in a process of rendering pictures, only such a smaller range as the foveal field of view needs to be rendered, and fuzzy rendering may be performed on the surrounding field of view. As eyes rotate, a high-definition rendering area varies with variation of a gazing point, which not only ensures an imaging quality but also reduces load on a graphics processing unit (GPU).

Nowadays, however, a sensor feeds an eye image back to the GPU for processing, after collecting the eye image. Such a data processing part increases workload of the GPU, and may lead to a system delay, which is not good for user experience.

SUMMARY

In view of this, embodiments of the present disclosure provide a display driving circuit, a driving method thereof and a display device for at least partly solving the problem with the conventional solutions that the existing gazing point tracking may increase the workload of the GPU and lead to the system delay.

Accordingly, an embodiment of the present disclosure provides a display driving circuit, including: an eye image acquisition unit, an eye tracker, a data driving chip and a graphics processor, wherein the eye image acquisition unit acquires an eye image;

the eye tracker is integrated into the data driving chip and is connected to the eye image acquisition unit, the eye tracker being configured to determine eye gazing coordinates according to the eye image sent from the eye image acquisition unit;

the graphics processor is connected to the eye tracker, the graphics processor being configured to process an image to be displayed, according to the eye gazing coordinates sent from the eye tracker; and the data driving chip is connected to the graphics processor, the data driving chip being configured to control a connected display panel to display, according to the processed image to be displayed which is sent from the graphics processor.

In a possible implementation, in the above display driving circuit according to the embodiment of the present disclosure, the graphics processor includes:

an area determination module configured to determine a high-definition display area and a low-definition display area of the image to be displayed, according to the eye gazing coordinates;

a rendering module configured to perform rendering processing on at least the high-definition display area of the image to be displayed;

a low-definition processing module configured to perform data processing on the low-definition display area of the image to be displayed; and a fusion module configured to perform fusion processing on images output by the rendering module and the low-definition processing module.

In a possible implementation, in the above display driving circuit according to the embodiment of the present disclosure, the rendering module is further configured to perform the rendering processing on the high-definition display area and the low-definition display area of the image to be displayed; and the low-definition processing module is further configured to perform resolution reduction processing on the low-definition display area of the image to be displayed.

In a possible implementation, in the above display driving circuit according to the embodiment of the present disclosure, the rendering module is further configured to perform the rendering processing only on the high-definition display area of the image to be displayed; and the low-definition processing module is further configured to perform compression processing on the low-definition display area of the image to be displayed.

In a possible implementation, the above display driving circuit according to the embodiment of the present disclosure further includes: a smart display module connected to the graphics processor, the smart display module being configured to control the display panel to perform multi-row simultaneous scanning on respective rows of sub-pixels of the low-definition display area and to perform progressive scanning on respective rows of sub-pixels of the high-definition display area, according to the processed image to be displayed which is sent from the graphics processor.

In a possible implementation, in the above display driving circuit according to the embodiment of the present disclosure, the smart display module is integrated into the data driving chip.

In a possible implementation, in the above display driving circuit according to the embodiment of the present disclosure, the graphics processor further includes:

an anti-distortion module configured to perform anti-distortion processing on the image output by the fusion module; and a coordinate transformation module configured to determine image gazing coordinates in the anti-distortion processed image corresponding to the eye gazing coordinates.

In another aspect, an embodiment of the present disclosure further provides a display device, including the above display driving circuit according to the embodiment of the present disclosure, and a display panel.

In a possible implementation, in the above display device according to the embodiment of the present disclosure, the display driving circuit includes a plurality of data driving chips that connect to a plurality of display panels in a one-to-one correspondence.

In yet another aspect, an embodiment of the present disclosure further provides a driving method of the above display driving circuit, including:

acquiring, by the eye image acquisition unit, the eye image;

determining, by the eye tracker, the eye gazing coordinates according to the eye image;

processing, by the graphics processor, the image to be displayed according to the eye gazing coordinates determined by the eye tracker; and controlling, by the data driving chip, the connected display panel to display according to the image to be displayed which has been processed by the graphics processor.

In a possible implementation, in the above driving method according to the embodiment of the present disclosure, the processing, by the graphics processor, the image to be displayed according to the eye gazing coordinates determined by the eye tracker includes:

determining a high-definition display area and a low-definition display area of the image to be displayed according to the eye gazing coordinates;

performing rendering processing on at least the high-definition display area of the image to be displayed;

performing data processing on the low-definition display area of the image to be displayed; and performing fusion processing on the rendering processed and data processed images.

In a possible implementation, in the above driving method according to the embodiment of the present disclosure, the performing rendering processing on at least the high-definition display area of the image to be displayed includes:

performing the rendering processing on the high-definition display area and the low-definition display area of the image to be displayed; and the performing data processing on the low-definition display area of the image to be displayed includes:

performing resolution reduction processing on the low-definition display area of the image to be displayed.

In a possible implementation, in the above driving method according to the embodiment of the present disclosure, the performing rendering processing on at least the high-definition display area of the image to be displayed includes:

performing the rendering processing only on the high-definition display area of the image to be displayed; and the performing data processing on the low-definition display area of the image to be displayed includes:

performing compression processing on the low-definition display area of the image to be displayed.

In a possible implementation, the above driving method according to the embodiment of the present disclosure further includes:

Controlling, by the smart display module, the display panel to perform multi-row simultaneous scanning on respective rows of sub-pixels of the low-definition display area and to perform progressive scanning on respective rows of sub-pixels of the high-definition display area, according to the processed image to be displayed which is sent from the graphics processor.

In a possible implementation, in the above driving method according to the embodiment of the present disclosure, the processing, by the graphics processor, the image to be displayed according to the eye gazing coordinates determined by the eye tracker further includes:

performing anti-distortion processing on the fusion processed image; and determining image gazing coordinates in the anti-distortion processed image corresponding to the eye gazing coordinates.

DETAILED DESCRIPTION OF PREFERRED EMBODIMENTS

In order to make the objectives, technical solutions, and advantages of the present disclosure clearer, particular implementations of the display driving circuit, the driving method thereof, and the display device according to the embodiments of the present disclosure will be described in detail with reference to the accompanying drawings. Obviously, the described embodiments are merely some but not all of the embodiments of the present disclosure. All other embodiments obtained by the skilled in the art based on the embodiments in the present disclosure without creative labors fall within the protection scope of the present disclosure.

Figure 1:
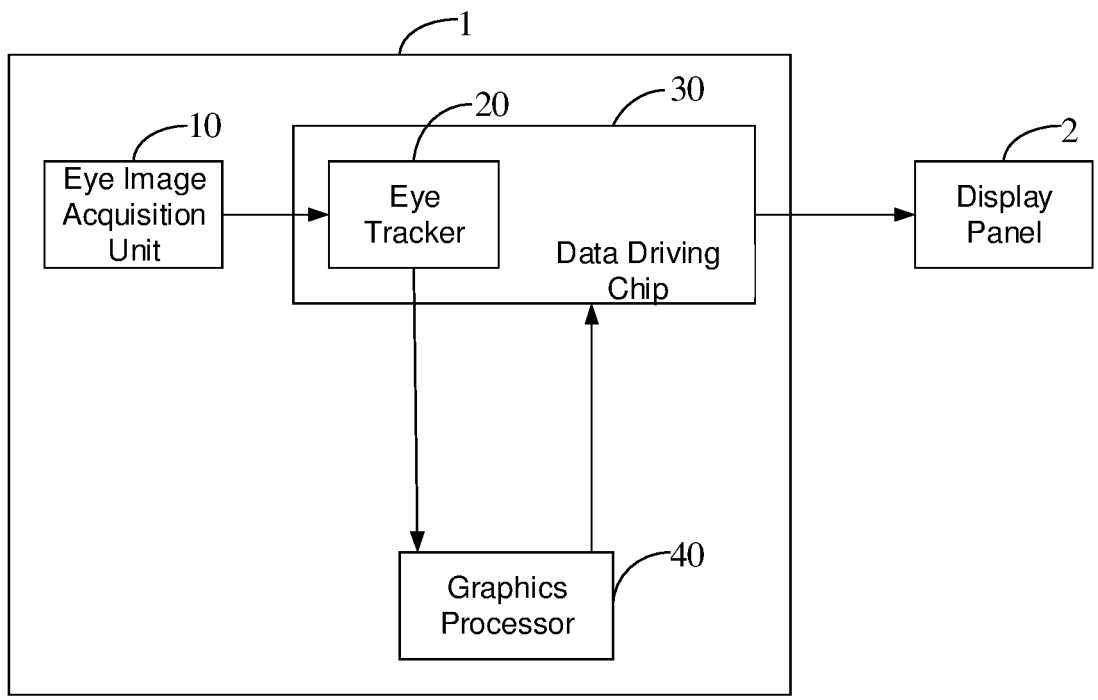
FIG. 1 is a block diagram schematically showing a structure of a first display driving circuit according to an embodiment of the present disclosure.
Figure 2:
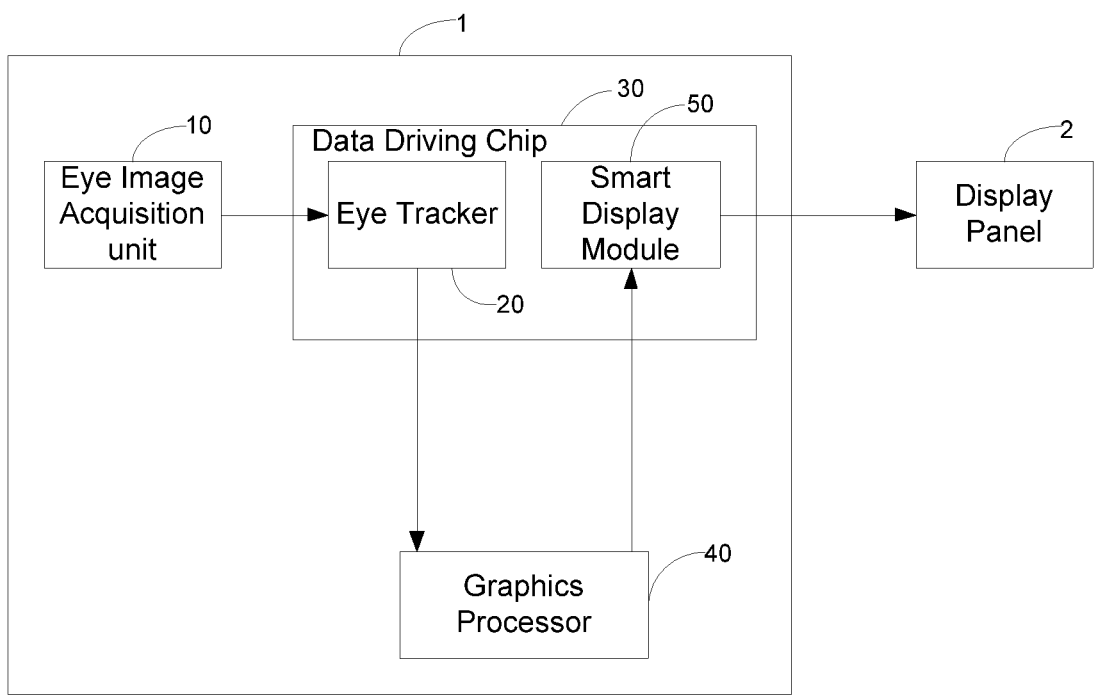
FIG. 2 is a block diagram schematically showing a structure of a second display driving circuit according to an embodiment of the present disclosure.
Figure 3:
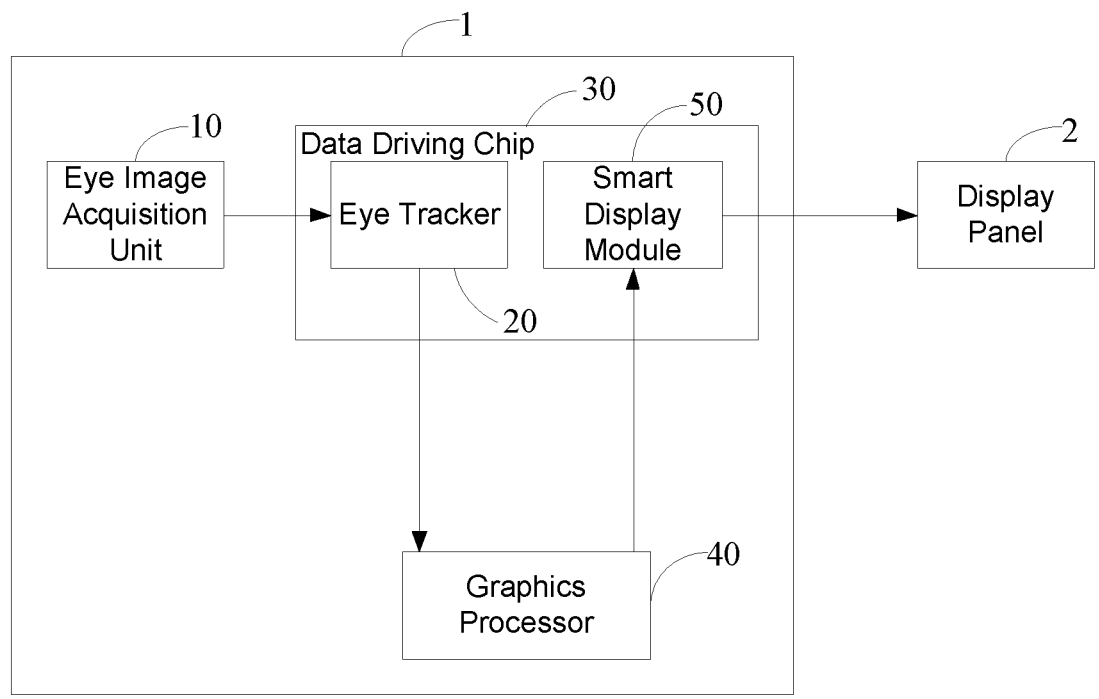
FIG. 3 is a block diagram schematically showing a structure of a third display driving circuit according to an embodiment of the present disclosure.
Figure 4:
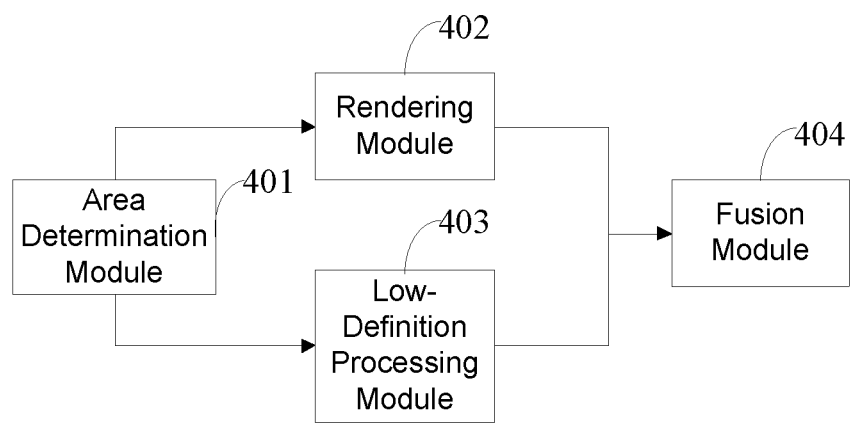
FIG. 4 is a block diagram schematically showing a structure of a first graphics processor in a display driving circuit according to an embodiment of the present disclosure.

As shown in FIGS. 1 to 3, a display driving circuit 1 according to an embodiment of the present disclosure includes an eye image acquisition unit 10, an eye tracking module (Tracking IP) 20, a data driving chip (DDIC) 30, and a graphics processor (GPU) 40.

The eye image acquisition unit 10 acquires an eye image.

The eye tracker 20 is integrated into the data driving chip 30 and is connected to the eye image acquisition unit 10, the eye tracker 20 being configured to determine eye gazing coordinates according to the eye image sent from the eye image acquisition unit 10.

The graphics processor 40 is connected to the eye tracker 20, the graphics processor 40 being configured to process an image to be displayed, according to the eye gazing coordinates sent from the eye tracker 20.

The data driving chip 30 is connected to the graphics processor 40, the data driving chip 30 being configured to control a connected display panel 2 to display, according to the processed image to be displayed which is sent from the graphics processor 40.

In particular, in the above display driving circuit according to the embodiment of the present disclosure, the eye tracker 20 is integrated into the data driving chip 30. The eye tracker 20 may determine the eye gazing coordinates according to the eye image sent from the eye image acquisition unit 10; then the graphics processor 40 processes the image to be displayed according to the eye gazing coordinates sent from the eye tracker 20; and finally, the data driving chip 30 controls the connected display panel to display according to the processed image to be displayed which is sent from the graphics processor 40. Since the eye tracker 20 is integrated into the data driving chip 30, that is, processing on the eye image is completed within the data driving chip 30, the workload of the graphics processor 40 may be reduced, so as to reduce the system delay and improve the user experience. In addition, the integration of the eye tracker 20 into the data driving chip 30 may further improve the circuit integration of the display driving circuit and reduce the complexity of the circuit, compared to the design of arranging the eye tracker 20 separately in a switch circuit.

Alternatively, in the above display driving circuit according to the embodiment of the present disclosure, the eye image acquisition unit 10 is generally implemented as a video camera to achieve its function of obtaining the eye image. Of course, in practical implementations, other image capturing devices, such as an infrared detector or the like, may also be used for achieving the function of the eye image acquisition unit 10, which is not limited herein. In addition, the eye image acquisition unit 10 may either acquire a monocular image, or a binocular image, which are not limited herein. After acquiring the eye image, the eye image acquisition unit 10 may transmit data to the eye tracker 20 integrated into the data driving chip 30 through a Camera Serial Interface (CSI).

Alternatively, in the above display driving circuit according to the embodiment of the present disclosure, the eye gazing coordinates determined by the eye tracker 20 after receiving the eye image may be monocular gazing coordinates or binocular gazing coordinates, which are not limited herein. In addition, the eye gazing coordinates determined by the eye tracker 20 are generally eye coordinates in a coordinate system relative to the display panel. The eye gazing coordinates determined by the eye tracker 20 may be transmitted to the graphics processor 40 through a Serial Peripheral Interface (SPI).

Alternatively, in the above display driving circuit according to the embodiment of the present disclosure, after receiving the eye gazing coordinates sent from the eye tracker 20, the graphics processor 40 may process the image to be displayed, according to actual requirements. For example, the image to be displayed may be moved to the vicinity of the eye gazing coordinates, so as to realize a function of real-time positioning the image to be displayed and an eye gazing point.

Alternatively, in the above display driving circuit according to the embodiment of the present disclosure, when being applied to virtual reality display, the graphics processor 40, in order to achieve the high-definition imaging in the foveal field of view, may include:

an area determination module 401 configured to determine a high-definition display area and a low-definition display area of the image to be displayed, according to the eye gazing coordinates; that is, to determine the high-definition display area corresponding to the foveal field of view and the low-definition display area corresponding to the surrounding field of view;

a rendering module 402 configured to perform rendering processing on at least the high-definition display area of the image to be displayed;

a low-definition processing module 403 configured to perform data processing on the low-definition display area of the image to be displayed; and a fusion module 404 configured to perform fusion processing on images output by the rendering module and the low-definition processing module.

Particularly, by the above processing of the rendering module 402 and the low-definition processing module 403, the high-definition rendering area may vary with the variation of the gazing point as the eyes rotate, which may achieve the requirement of the virtual reality display.

Alternatively, in the above display driving circuit according to the embodiment of the present disclosure, the rendering module 402 may be configured to perform the rendering processing on the high-definition display area and the low-definition display area. That is, the rendering module 402 may perform the rendering processing on the entire image to be displayed; then, the low-definition processing module 403 may be configured to perform resolution reduction processing on the low-definition display area of the image to be displayed, e.g., performing fuzzing processing on the low-resolution display area, in order to reduce a data amount of the low-definition display area. In this way, since the rendering module 402 needs to perform the rendering processing on the low-definition display area, the workload of the rendering module 402 is increased, and the data amount in the low-definition display area is larger, and thus the amount of image data after fusion processing by the fusion module 404 is larger, resulting in a problem of a larger amount of data transmitted from the graphics processor 40 to the data driving chip 30, which is disadvantageous for outputting the image.

In view of this, alternatively, in the above display driving circuit according to the embodiment of the present disclosure, the rendering module 402 may further be configured to perform the rendering processing only on the high-definition display area, which may reduce the workload of the rendering module 402 and improve the efficiency of image rendering; and the low-definition processing module 403 may further be configured to perform compression processing on the low-definition display area, in order to reduce the data amount of the low-definition display area. In this way, the amount of the image data after the fusion processing by the fusion module 404 is smaller, so that the amount of data transmitted from the graphics processor 40 to the data driving chip 30 may be smaller to improve the data transmission rate. Thus, a higher image output frame frequency may be supported, the output delay of GPU may be reduced, and the time for refreshing the corresponding position image moving from the eye to the display panel for updating may be decreased, which may improve the user experience.

Alternatively, the above display driving circuit according to the embodiment of the present disclosure, as shown in FIGS. 2 and 3, may further include a smart display module 50 connected to the graphics processor.

The display module (Smart View IP) 50 may be configured to control the display panel 2 to perform multi-row simultaneous scanning on respective rows of sub-pixels of the low-definition display area and to perform progressive scanning on respective rows of sub-pixels of the high-definition display area, according to the processed image to be displayed which is sent from the graphics processor 40. This may save the number of rows integrally scanned by the display panel, and may save a scanning time per frame, thereby increasing a charging time per row.

Alternatively, in the above display driving circuit according to the embodiment of the present disclosure, as shown in FIG. 3, the smart display module 50 may be integrated into the data driving chip 30, which facilitates a higher integration of the respective modules in the display driving circuit.

Of course, in particular implementations, as shown in FIG. 2, the smart display module 50 may also be arranged outside the data driving chip 30 and between the data driving chip 30 and the display panel 2. That is, after the data driving chip 30 forwards the image to be displayed sent from the graphics processor 40 to the smart display module 50 for processing, the smart display module 50 controls the display panel 2 to perform the scanning for display.

Figure 5:
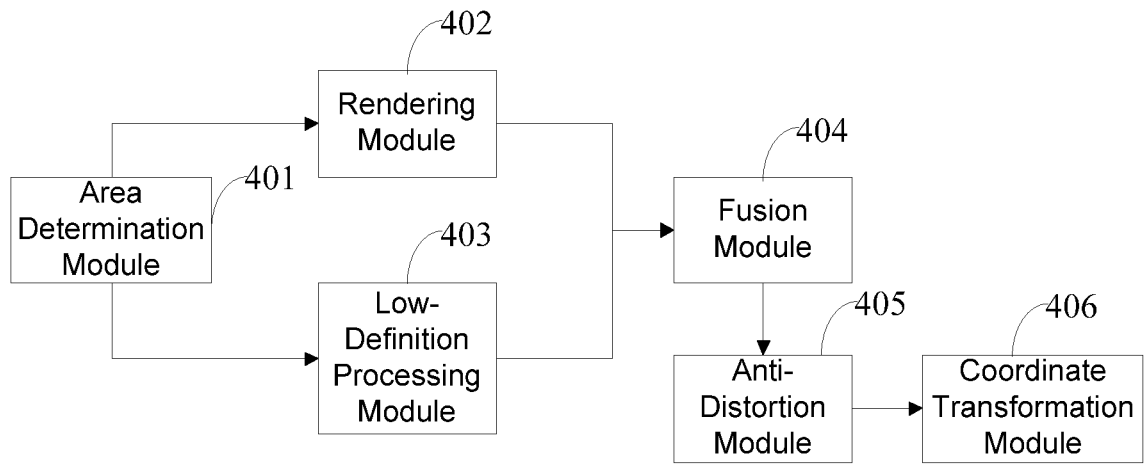
FIG. 5 is a block diagram schematically showing a structure of a second graphics processor in a display driving circuit according to an embodiment of the present disclosure.

Alternatively, in the above display driving circuit according to the embodiment of the present disclosure, when being applied to the virtual reality display, the display panel generally has a certain curvature for matching with the human eye's angle of view. That is, the display panel is a curved surface display. As shown in FIG. 5, the graphics processor 40 may further include:

an anti-distortion module 405 configured to perform anti-distortion processing on the images output by the fusion module 404, i.e., reducing the image distortion caused by the curved surface display; and a coordinate transformation module 406 configured to determine image gazing coordinates in the anti-distortion processed image corresponding to the eye gazing coordinates. After the anti-distortion processing, the position of the eye gazing coordinates may change in the anti-distortion processed image, and thus it is required to re-correspond the image gazing coordinates in the anti-distortion processed image to the eye gazing coordinates, and to inform the data driving chip 30.

Based on the same inventive concept, an embodiment of the present disclosure further provides a display device. The display device may be any product or component having a display function, such as a mobile phone, a tablet, a television, a display, a notebook, a digital photo frame, a navigator, etc. For the implementation of the display device, reference may be made to the above embodiments of the display driving circuit, and details are not described herein again.

Figure 6:
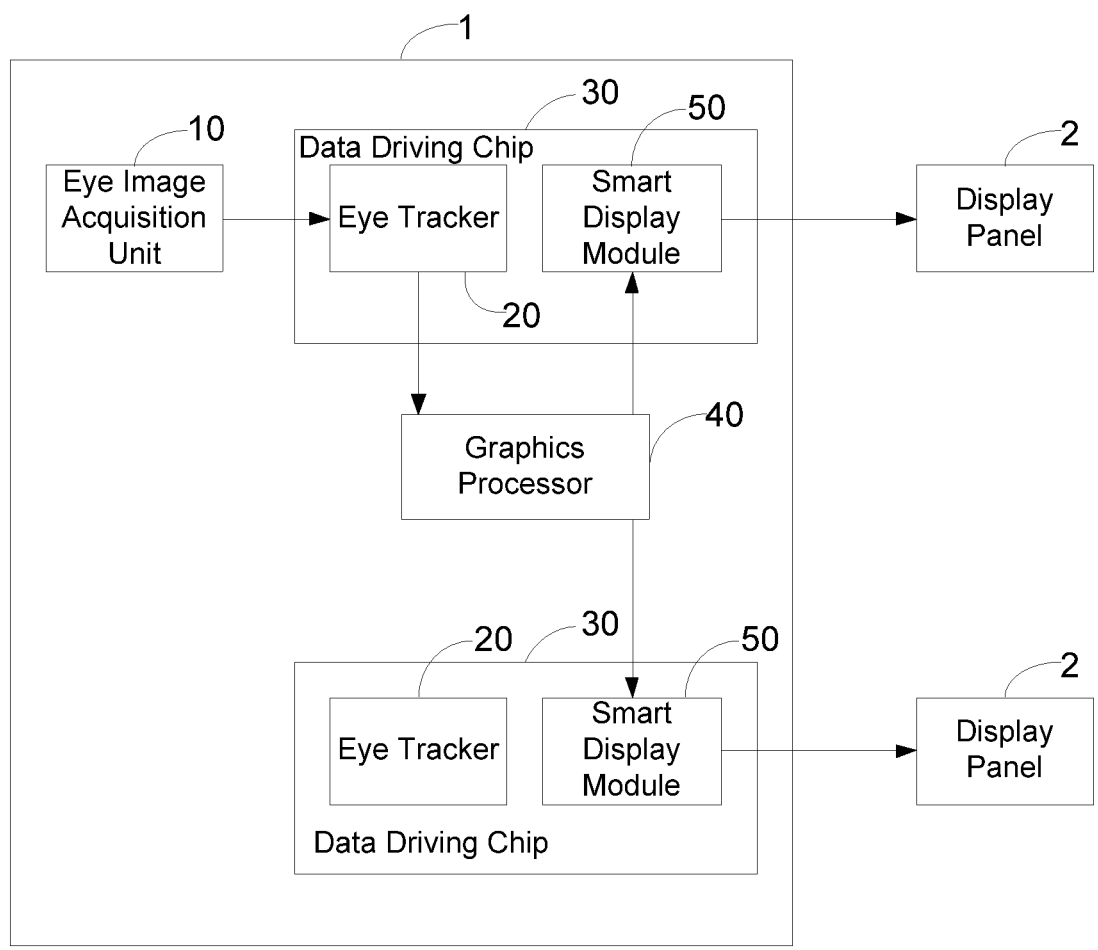
FIG. 6 is a block diagram schematically showing a structure of a display device according to an embodiment of the present disclosure.

Particularly, the display device according to the embodiment of the present disclosure, as shown in FIG. 6, includes the above display driving circuit 1 according to the embodiments of the present disclosure and a display panel 2.

Alternatively, in the above display device according to the embodiment of the present disclosure, as shown in FIG. 6, there may be a plurality of data driving chips 30 in the display driving circuit 1 and a plurality of display panels 2, the plurality of display panels being connected to the plurality of data driving chips in the display driving circuit in a one-to-one correspondence.

Particularly, in the above display device according to the embodiment of the present disclosure, two display panels 2 may be provided to respectively correspond to a left-eye image and a right-eye image displayed in the virtual reality. Moreover, the internal structures of the data driving chips 30 to which the two display panels 2 are connected may be completely the same. As shown in FIG. 6, both of the data driving chips 30 have the same eye trackers 20 and smart display modules 50, so that the data driving chips 30 may be in mass production for the same model, in order to save production costs. In an embodiment of the monocular image, the eye tracker 20 in any of data driving chips 30 may be connected to the eye image acquisition unit 10 and the graphics processor 40 respectively, and the eye tracker 20 in another data driving chip 30 may not be connected to the eye image acquisition unit 10 and the graphics processor 40, i.e., in an idle state.

Based on the same inventive concept, an embodiment of the present disclosure further provides a driving method of the above display driving circuit. Since the principle of the method for solving the problem is similar to that of the display driving circuit, reference may be made to the above embodiments of the display driving circuit for the implementation of the method, and details are not described herein again.

Figure 7:
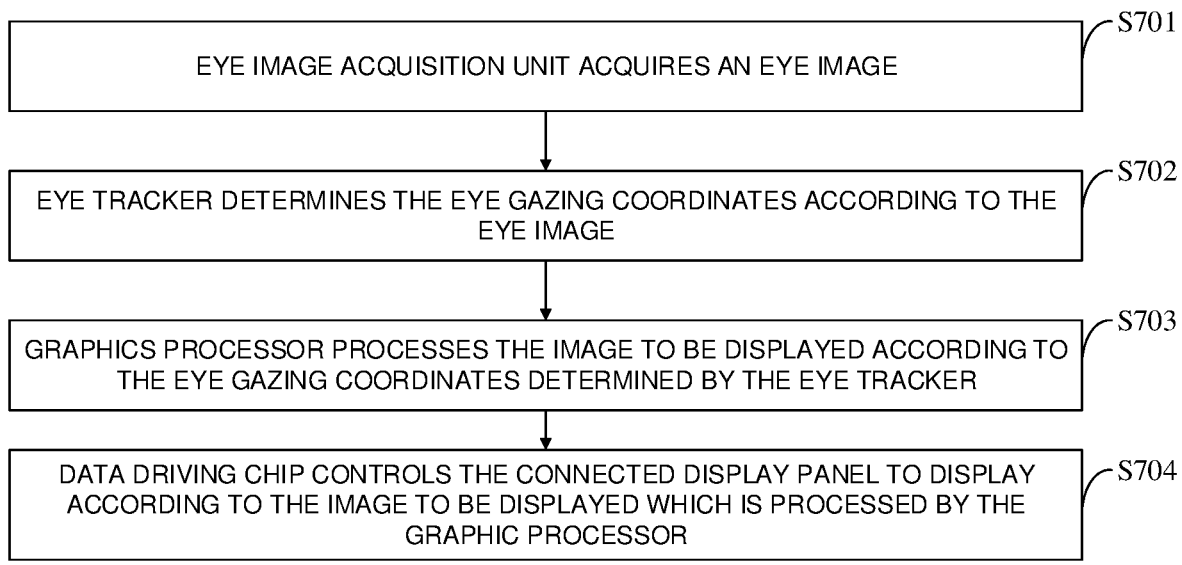
FIG. 7 is a flowchart schematically showing a first driving method of a display driving circuit according to an embodiment of the present disclosure.

Particularly, the driving method of the above display driving circuit according to the embodiments of the present disclosure, as shown in FIG. 7, may include following steps:

S701 of acquiring, by the eye image acquisition unit, the eye image;

S702 of determining, by the eye tracker, the eye gazing coordinates according to the eye image;

S703 of processing, by the graphics processor, the image to be displayed according to the eye gazing coordinates determined by the eye tracker; and S704 of controlling, by the data driving chip, the connected display panel to display according to the image to be displayed which has been processed by the graphics processor.

Figure 8:
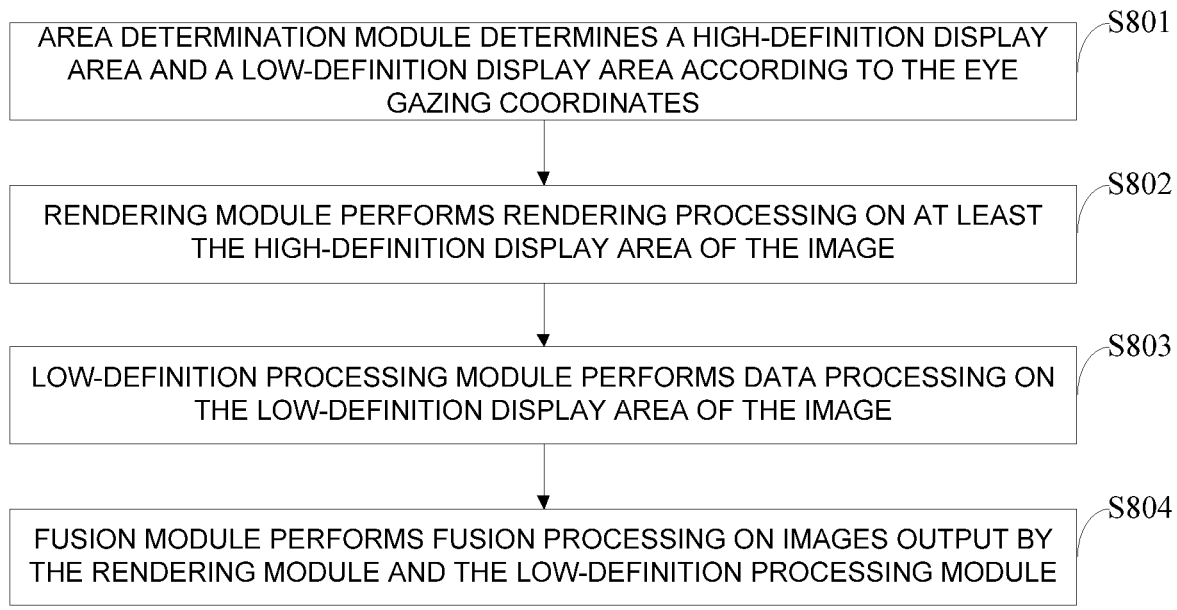
FIG. 8 is a flowchart schematically showing a second driving method of a display driving circuit according to an embodiment of the present disclosure.
Figure 9:
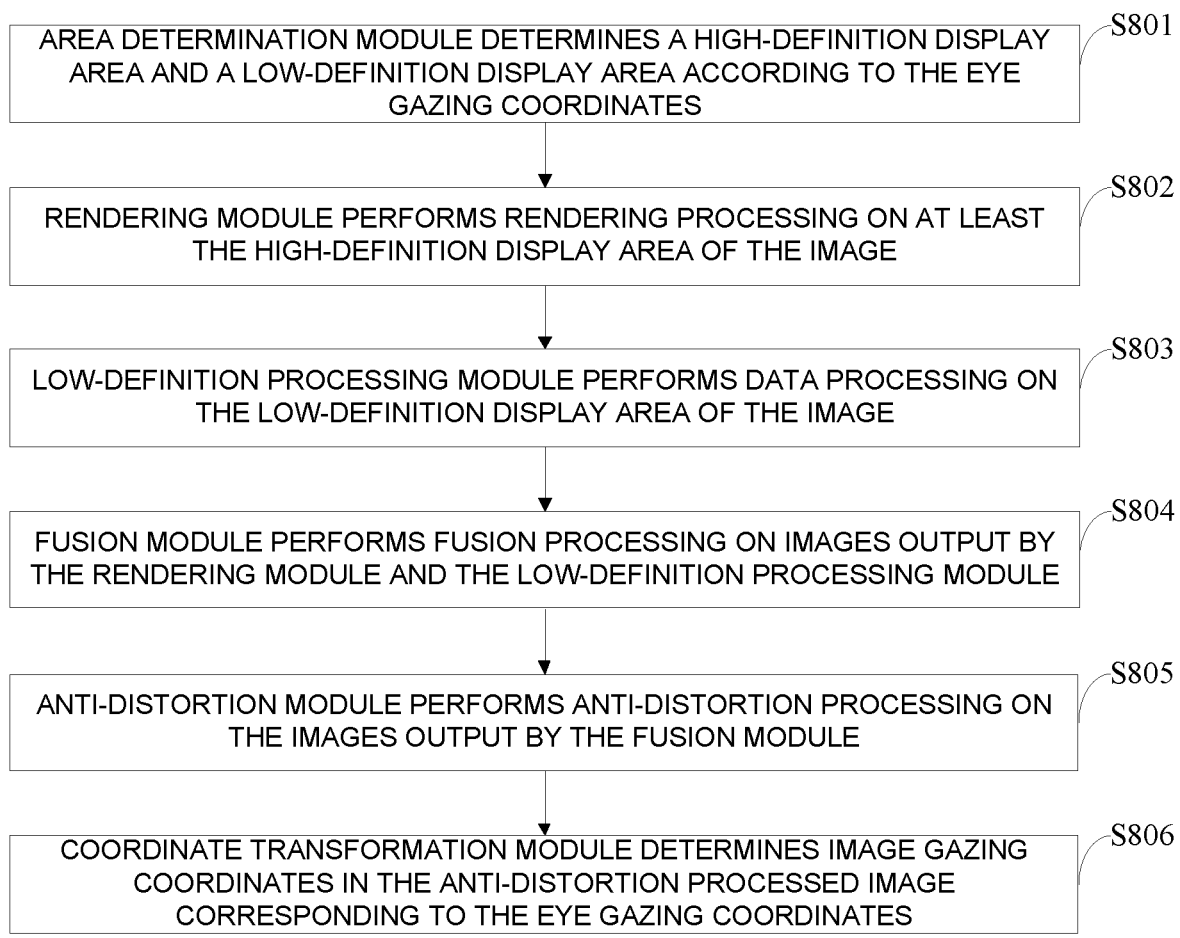
FIG. 9 is a flowchart schematically showing a third driving method of a display driving circuit according to an embodiment of the present disclosure.

Alternatively, in the above driving method according to the embodiment of the present disclosure, the step S703 of processing, by the graphics processor, the image to be displayed according to the eye gazing coordinates determined by the eye tracker, as shown in FIG. 8, may include:

S801 of determining, by e.g., the area determination module, a high-definition display area and a low-definition display area of the image to be displayed according to the eye gazing coordinates;

S802 of performing, by e.g., the rendering module, rendering processing on at least the high-definition display area of the image to be displayed;

S802 of performing, by e.g., the low-definition processing module, data processing on the low-definition display area of the image to be displayed; and S803 of performing, by e.g., the fusion module, fusion processing on the rendering processed and data processed images.

Alternatively, in the above driving method according to the embodiment of the present disclosure, the step S802 of performing rendering processing on at least the high-definition display area of the image to be displayed may be implemented by performing the rendering processing on the high-definition display area and the low-definition display area of the image to be displayed.

Accordingly, the step S803 of performing data processing on the low-definition display area of the image to be displayed may be implemented by performing resolution reduction processing on the low-definition display area of the image to be displayed.

Alternatively, in the above driving method according to the embodiment of the present disclosure, the step S802 of performing rendering processing on at least the high-definition display area of the image to be displayed may be implemented by performing the rendering processing only on the high-definition display area of the image to be displayed Accordingly, the step S803 of performing data processing on the low-definition display area of the image to be displayed may be implemented by performing compression processing on the low-definition display area of the image to be displayed.

Alternatively, the above driving method according to the embodiment of the present disclosure may further include following steps:

Controlling, by the smart display module, the display panel to perform multi-row simultaneous scanning on respective rows of sub-pixels of the low-definition display area and to perform progressive scanning on respective rows of sub-pixels of the high-definition display area, according to the processed image to be displayed which is sent from the graphics processor.

Alternatively, in the above driving method according to the embodiment of the present disclosure, the step S703 of processing, by the graphics processor, the image to be displayed according to the eye gazing coordinates determined by the eye tracker may further include:

S805 of performing, by e.g., the anti-distortion module, anti-distortion processing on the fusion processed image; and S806 of determining, by e.g., the coordinate transformation module, image gazing coordinates in the anti-distortion processed image corresponding to the eye gazing coordinates.

In the display driving circuit, the driving method thereof and the display device according to the embodiments of the present disclosure, the eye tracker is integrated into the data driving chip. The eye tracker may determine the eye gazing coordinates according to the eye image sent from the eye image acquisition unit; then the graphics processor processes the image to be displayed according to the eye gazing coordinates sent from the eye tracker; and finally, the data driving chip controls the connected display panel to display according to the processed image to be displayed which is sent from the graphics processor. Since the eye tracker is integrated into the data driving chip, that is, processing on the eye image is completed within the data driving chip, the workload of the graphics processor may be reduced, so as to reduce the system delay and improve the user experience. In addition, the integration of the eye tracker into the data driving chip may further improve the circuit integration of the display driving circuit and reduce the complexity of the circuit, compared to the design of arranging the eye tracker separately in a switch circuit.

Obviously, the skilled in the art may make various modifications and variations to the present disclosure without departing from the spirit and scope of the present disclosure. In this way, if these modifications and variations of the present disclosure fall within the scope of the claims of the present disclosure and its equivalent technologies, the present disclosure is also intended to include these modifications and variations.

What is claimed is:

1. A display driving circuit, comprising an eye image acquisition unit, an eye tracker, a data driving chip, a smart display module and a graphics processor, wherein:
   the eye image acquisition unit is configured to acquire an eye image;
   the eye tracker is connected to the eye image acquisition unit, the eye tracker being configured to determine eye gazing coordinates according to the eye image sent from the eye image acquisition unit;
   the graphics processor is connected to the eye tracker, the graphics processor being configured to process an image to be displayed, according to the eye gazing coordinates sent from the eye tracker;
   the data driving chip is connected to the graphics processor, the data driving chip being configured to control a connected display panel to display, according to the processed image to be displayed which is sent from the graphics processor;
   the graphics processor comprises an area determination module configured to determine a high-definition display area and a low-definition display area of the image to be displayed, according to the eye gazing coordinates;
   the smart display module is connected to the graphics processor, and configured to control the display panel to perform multi-row simultaneous scanning on respective rows of sub-pixels of the low-definition display area and to perform progressive scanning on respective rows of sub-pixels of the high-definition display area, according to the processed image to be displayed which is sent from the graphics processor; and
   the eye tracker and the smart display module are integrated into the data driving chip.

2. The display driving circuit according to claim 1, wherein the graphics processor comprises:
   a rendering module configured to perform rendering processing on at least the high-definition display area of the image to be displayed;
   a low-definition processing module configured to perform data processing on the low-definition display area of the image to be displayed; and
   a fusion module configured to perform fusion processing on images output by the rendering module and the low-definition processing module.

3. The display driving circuit according to claim 2, wherein:
   the rendering module is further configured to perform the rendering processing on the high-definition display area and the low-definition display area of the image to be displayed; and
   the low-definition processing module is further configured to perform resolution reduction processing on the low-definition display area of the image to be displayed.

4. The display driving circuit according to claim 2, wherein:
   the rendering module is further configured to perform the rendering processing only on the high-definition display area of the image to be displayed; and
   the low-definition processing module is further configured to perform compression processing on the low-definition display area of the image to be displayed.

5. The display driving circuit according to claim 2, wherein the graphics processor further comprises:
   an anti-distortion module configured to perform anti-distortion processing on the image output by the fusion module; and
   a coordinate transformation module configured to determine image gazing coordinates in the anti-distortion processed image corresponding to the eye gazing coordinates.

6. A display device, comprising the display driving circuit according to claim 1 and a display panel.

7. The display device according to claim 6, wherein the display driving circuit comprises a plurality of data driving chips that connect to a plurality of display panels in one-to-one correspondence.

8. The display device according to claim 6, wherein the graphics processor comprises:
 a rendering module configured to perform rendering processing on at least the high-definition display area of the image to be displayed;
 a low-definition processing module configured to perform data processing on the low-definition display area of the image to be displayed; and
 a fusion module configured to perform fusion processing on images output by the rendering module and the low-definition processing module.

9. A driving method of the display driving circuit according to claim 1, comprising:
 acquiring, by the eye image acquisition unit, the eye image;
 determining, by the eye tracker, the eye gazing coordinates according to the eye image;
 processing, by the graphics processor, the image to be displayed according to the eye gazing coordinates determined by the eye tracker, wherein the processing comprises determining a high-definition display area and a low-definition display area of the image to be displayed according to the eye gazing coordinates; and
 controlling, by the data driving chip, the connected display panel to display according to the image to be displayed which has been processed by the graphics processor, wherein the controlling comprises controlling the display panel to perform multi-row simultaneous scanning on respective rows of sub-pixels of the low-definition display area and to perform progressive scanning on respective rows of sub-pixels of the high-definition display area, according to the processed image to be displayed which is sent from the graphics processor.

10. The driving method according to claim 9, wherein processing, by the graphics processor, the image to be displayed according to the eye gazing coordinates determined by the eye tracker comprises:
 performing rendering processing on at least the high-definition display area of the image to be displayed;
 performing data processing on the low-definition display area of the image to be displayed; and
 performing fusion processing on the rendering processed and data processed images.

11. The driving method according to claim 10, wherein:
 performing rendering processing on at least the high-definition display area of the image to be displayed further comprises performing the rendering processing on the high-definition display area and the low-definition display area of the image to be displayed; and
 performing data processing on the low-definition display area of the image to be displayed further comprises performing resolution reduction processing on the low-definition display area of the image to be displayed.

12. The driving method according to claim 10, wherein:
 performing rendering processing on at least the high-definition display area of the image to be displayed further comprises performing the rendering processing only on the high-definition display area of the image to be displayed; and
 performing data processing on the low-definition display area of the image to be displayed further comprises performing compression processing on the low-definition display area of the image to be displayed.

13. The driving method according to claim 10, wherein processing, by the graphics processor, the image to be displayed according to the eye gazing coordinates determined by the eye tracker further comprises:
 performing anti-distortion processing on the fusion processed image; and
 determining image gazing coordinates in the anti-distortion processed image corresponding to the eye gazing coordinates.

* * * * *